United States Patent [19]

Riethmann

[11] Patent Number: 4,631,785

[45] Date of Patent: Dec. 30, 1986

[54] CLASP FOR A CHAIN

[76] Inventor: Alois W. Riethmann, Toblerstrasse 60, 8044 Zurich, Switzerland

[21] Appl. No.: 765,649

[22] Filed: Aug. 15, 1985

[30] Foreign Application Priority Data

Sep. 5, 1984 [CH] Switzerland ............... 4234/84

[51] Int. Cl.$^4$ ............................................. A44B 13/02
[52] U.S. Cl. ................................. 24/232 R; 24/233; 24/239
[58] Field of Search ............... 24/232, 233, 234, 235, 24/236, 237, 239, 499, 625, 590, 598

[56] References Cited

U.S. PATENT DOCUMENTS

| | | | |
|---|---|---|---|
| 766,045 | 7/1904 | Kitchin | 24/232 |
| 780,343 | 1/1905 | Huff | 24/232 |
| 947,764 | 1/1910 | Schartow | 24/234 |
| 1,206,620 | 11/1916 | Troop | 24/234 |
| 1,264,676 | 4/1918 | Morgan | 24/232 |
| 1,672,710 | 6/1928 | Chittenden | 24/233 |
| 2,166,666 | 7/1939 | Rolan | 24/234 |
| 2,457,435 | 12/1948 | Beckman | 24/239 |
| 2,544,147 | 3/1951 | Evans | 24/233 |
| 3,676,902 | 7/1972 | Pearson | 24/499 |
| 4,106,310 | 8/1978 | Abramowitz | 24/237 |
| 4,458,393 | 7/1984 | Pogharian et al. | 24/234 |
| 4,546,523 | 10/1985 | Bailey, Jr. | 24/234 |

FOREIGN PATENT DOCUMENTS 1503850 10/1967 France .
309503 5/1930 United Kingdom ............ 24/234

*Primary Examiner*—Victor N. Sakran
*Attorney, Agent, or Firm*—George W. Rauchfuss, Jr.

[57] ABSTRACT

The clasp for a chain consists of three parts, of a casing bent to an U-shape, a plate-like locking member located between the flanks of the casing and pivotably supported by a pin. The locking member has at one of its ends a hook and at the opposite end an eyelet. The pin has a rectangular cross-sectional shape and is supported in the casing in a nonrotatable manner. A rectangular opening located in the locking member opens into a slot which forms a resiliently flexible tongue abutting the opening. A pivoting movement of the locking member within the casing liberates the insertion opening otherwise closed off by an edge area of the casing. Because the eyelet as well as the hook are located at the locking member, a pulling force of the chain will be directly transmitted by this part and accordingly, there is no danger that the clasp will open when subject to a pulling force.

4 Claims, 7 Drawing Figures

CLASP FOR A CHAIN

BACKGROUND OF THE INVENTION

1. Field of the Invention

The present invention relates to a clasp for a chain, including a casing, a locking member resiliently supported in the casing and movable from a closed into an open position, a spring member coupled to the locking member and operative to maintain the locking member in its closed position, which casing is a flat shaped article bent to a U-form, which locking member has the shape of a flat plate and is pivotable between the flank sections of the casing around a pin located at a central area of the casing, has one end formed to have the shape of a hook, the opening of which being closed off by an edge section of the casing, and has an eyelet provided at the end opposite of the hook, the locking member having further a projection projecting out of the casing and acting as operating member for inducing the opening movement of the hook.

2. Description of the Prior Art

Clasps for chains are available in numerous various designs. Best known and available worldwide is the so-called spring-ring clasp. This spring-ring clasp comprises a casing manufactured from a tube and bent to the shape of an open ring, in which casing a ring shaped closure member is supported resiliently. The drawback of this worldwide known clasp is that under certain circumstances it will open unintentionally if the chain is subjected to a pulling force. Moreover, this known clasp is relatively expensive to manufacture and can be operated, i.e. opened only by the aid of a fingernail.

A sheet metal snap hook is disclosed in the U.S. Pat. No. 2,166,666. This sheet metal snap hook comprises a spiral spring which biasses the hook into its closing position and, moreover, is not provided with any operating member allowing an easy and safe blind operating of the snap hook when designed on a small scale, for instance, for use as snap hook for a jewelry chain. The jewelry clasp of the U.S. Pat. No. 4,458,393 comprises also a spiral biassing spring and is rather difficult to operate because a shoulder portion for pivoting its hook member must be given a pivoting pressing movement which again is rather difficult to induce if the clasp is designed in small dimensions as common by jewelry.

In the U.S. Pat. No. 2,544,147 discloses a clasp having a prong section biassed by a resilient portion into its closed position. The prong is operated by a lug for inducing a pivoting movement of the prong. Again, a pivoting movement must be made for operating the prong and, moreover, the prong is in no way protected against an obliquely attacking pulling force such that when subjected to a pulling force this clasp can open itself.

The French patent specification FR-PS No. 1.503.850 illustrates a clasp for, for instance, bracelets, chains etc. which has a pivotably supported double ended hook member. This hook member is not biassed into a closed position and, therefore, will open quite easily, specifically if the pulling force exerted thereon by e.g. a chain does not act exactly in the direction of the center axis of this clasp. Also, this clasp is rather difficult to operate blindly, for instance, when located at the neck of a bearer of a jewelry chain.

SUMMARY OF THE INVENTION

The general object of the present invention is to provide a clasp which fulfills the following conditions:

1. It shall remain securely closed when subject to pulling forces;
2. It shall be operable manually with ease and blind, i.e. without the bearer having to see the clasp for its operation and without the necessity of having to use a fingernail for operating;
3. It shall consist of a small amount of individual parts which may be assembled at a minimum on expenditure, on time and without the need of any soldering operation;
4. It shall display an aesthetically beautiful shape;
5. It should lend itself for manufacturing completely of gold;
6. It should comprise parts which allow a stamping with the hallmark and the fine gold content.

A further object is to provide a clasp for a chain, of which the pivot pin comprises a rectangular cross-sectional shape and is supported in the casing in a nonrotatable manner, and which locking member is made of a spring elastic material and comprises a rectangular opening corresponding in shape to the pin.

The invention as claimed is intended to provide a remedy. It solves the problem of how to design a clasp for a chain which consists of a minimum and of aesthetically acceptable parts, which remains safely closed when subject to pulling forces and can be easily operated by means of the fingertips without having to use a fingernail.

The advantages offered by the invention are mainly that the clasp is made of a few parts which are extremely easy to produce and may be assembled without any soldering. The clasp will not open when subject to a pulling force and may be operated simply by holding it between two fingers and pressing these two fingers, specifically the fingertips together.

The inventive clasp is characterized, in that the pin has a rectangular cross-sectional shape and is supported in the casing in a nonrotatable manner, that the locking member is made of a spring elastic material and comprises a rectangular opening corresponding in shape to the pin.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENTS

The clasp illustrated in FIGS. 1-5 comprises three parts only which are assembled without any soldering. These parts are a locking member 10, a casing 20 and a rectangular pin 30, which pin 30 is nonrotatably mounted and supported in casing 20.

Figure 1:
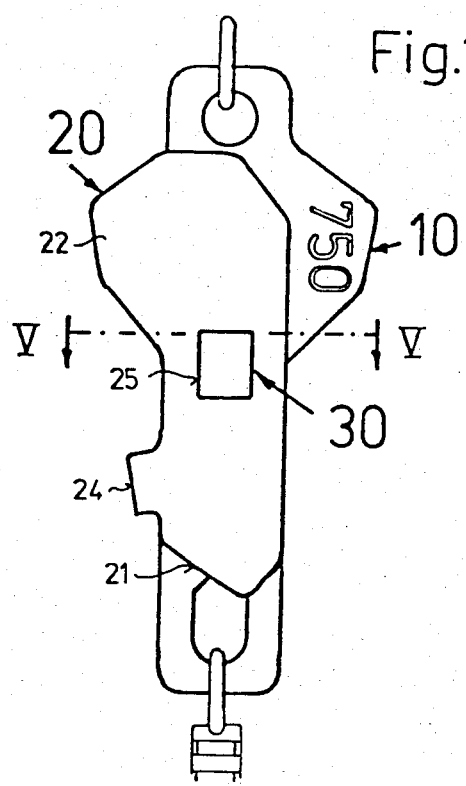
FIG. 1 illustrates a side view of a clasp for a chain.
Figure 2:
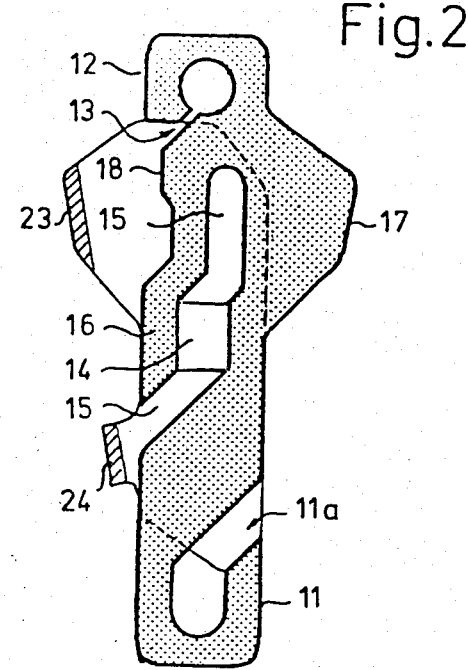
FIG. 2 illustrates a section through the casing illustrating the locking member in its closed position.

For ease of identification the specific shape of the locking member 10 is illustrated in FIG. 2 by a dotted area. The locking member 10 is a metal sheet or plate-shaped article, i.e. it is a sheet metal part stamped, for instance, from a white gold plate. The material used should have spring-elastic features. The lower end of the locking member has the shape of a hook or prong, respectively, 11 having an opening 11a, which is covered in the closed position by an edge area 21 of the casing 20 (see FIG. 1). The opposite, upper end of the locking member 10 comprises a closed eyelet 12. The term "closed" is to be understood such, that an end of a chain mounted to the eyelet is normally mounted in a not dismountable fashion. According to the illustrated example the "closed eyelet" is provided with a slot 13 allowing the eyelet to be bent open for receipt of a closed ring of a respective chain. This eyelet 12 could be designed also without mentioned slot 13. In such case the coupling ring of or for a chain must be bent open, inserted through the eyelet and soldered together thereafter.

The center area of the locking member 10 has a rectangular opening 14 which receives the pin 30. This opening 14 passes into a slot 15 such that a resiliently flexible tongue 16 is formed by the material adjacent of slot 15. At its upper right hand area the locking member 10 is provided with a projection 17 corresponding in shape due to aesthetical reasons to a projection 22 formed similarly at the casing 20. Finally, a further projection 18 is located below the eyelet 12, which projection 18 forms a stop member.

The shape of the casing 20 is clearly visible in FIG. 1. This casing 20 is a shaped article bent to a U-form and having two mirror-inverted flanks, between which flanks the locking member 10 described above is pivotably supported to pivot around pin 30. The two flanks are interconnected via the two rear wall sections 23, 24 of the casing 20 such as most clearly illustrated in FIG. 2. The bottom area 21 of the two flanks covers in the closed state of the clasp the insertion opening or receiving opening 11a of hook 11. The rear part 23 of the casing forms additionally a stop against an excessive opening of the clasp, whereby projection 18 of the locking member 10 will contact flank 23. At the center areas of the flanks rectangular openings 25 are provided, which openings 25 receive pin 30.

Figure 4:
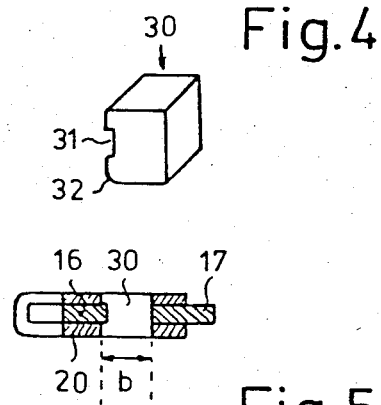
FIG. 4 is a perspective view of the pin.

This pin 30 is provided with a rectangular groove 31 such as illustrated specifically in FIG. 4 and the inner width of this rectangular groove 31 corresponds to the thickness of the metal sheet forming the locking member 10. Accordingly, pin 30 can be inserted through the openings 25 of the flanks of the casing 20 and be held in place due to the spring elastic force of the resiliently flexible tongue 16. The width b (see FIG. 5) of the openings of the casing 25 is somewhat larger than the opening 14 in the locking member 10.

Figure 5:
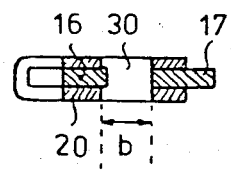
FIG. 5 is a section along line V—V of FIG. 1.

FIG. 4 illustrates the pin 30 including its groove 31 and FIG. 5 is a view of a section along line V—V of FIG. 1. FIG. 5 illustrates clearly how tongue 16 engages into the rectangular groove 31 and securely holds the assembled pin 30.

Figure 3:
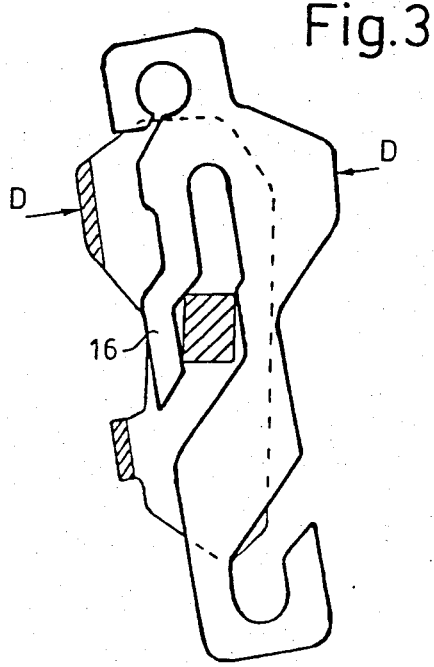
FIG. 3 is a view of the section similar to FIG. 2, however, in which the locking member is in its open position.

FIG. 3 illustrates the clasp in its opened state. For opening the clasp the user exerts, for instance, by means of the fingertips of the thumb and of the index finger a pressure D onto the two oppositely located projections 17 and 22, accordingly the locking member 10 will pivot around the pin 30 held nonrotatably in the casing 20 and accordingly the resiliently flexible tongue 16 is stressed or tensioned, respectively. As illustrated in FIG. 3, such pivoting causes the insertion opening 11a of hook 11 to be exposed and accordingly, the eyelet of an end of a chain can be hooked on or hooked off, respectively.

This clasp fulfills the demands stated earlier ideally. The ends of a respective chain are hooked onto the eyelet 12 and the hook 11, which two members form part of a single piece, namely, of the locking member 10. If now the chain is subject to a pulling force, there exists absolutely no danger of an unintentional opening of the clasp because such pulling force has no force component acting in direction of the opening of the clasp.

In spite of above feature this clasp can be opened extremely easily without the necessity of using a fingernail. Accordingly, there is no danger of the bearer of a chain having this clasp breaking his fingernail.

The clasp consists of three parts only, namely of the locking member 10, the casing 20 and the pin 30. The pieces 10 and 20 can be produced by a stamping of gold sheet leaf or another sheet metal and the pin 30 has an extremely simple shape. These three parts can be assembled extremely easily. Under some conditions it may be advantageous to provide the pin 30 with a beveled snap-in edge 32 such that the pin can be mounted more easily when overcoming the spring elastic force of tongue 16.

If this clasp is made of gold, the projection 17 of the locking member 10 provides enough space for the placing of stampings of the fine gold content and of the hallmark of the manufacturer. FIG. 1 illustrates as example a fine gold content stamping of 750. The general shape of the clasp corresponds to the modern aesthetic feelings.

Figure 6:
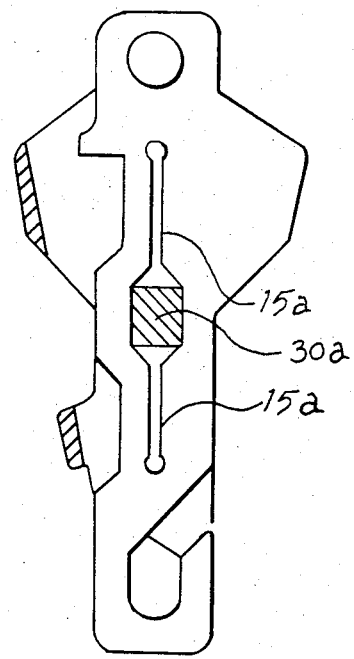
FIG. 6 is a view of a section, which is similar to the section illustrated in FIG. 2, of a further embodiment of the invention.

FIG. 6 shows a further embodiment of the clasp described above. This embodiment of FIG. 6 comprises a rectangular pin 30a which is rigidly held in the casing in a nonrotatable manner. The difference between this embodiment and the preceding embodiment according to FIGS. 1-3 is that no slot is provided which is open at its outside end. In place thereof two slots 15a are provided in the locking member, which slots 15a open into the rectangular opening. The outer contour of this locking member is accordingly changed somewhat.

Figure 7:
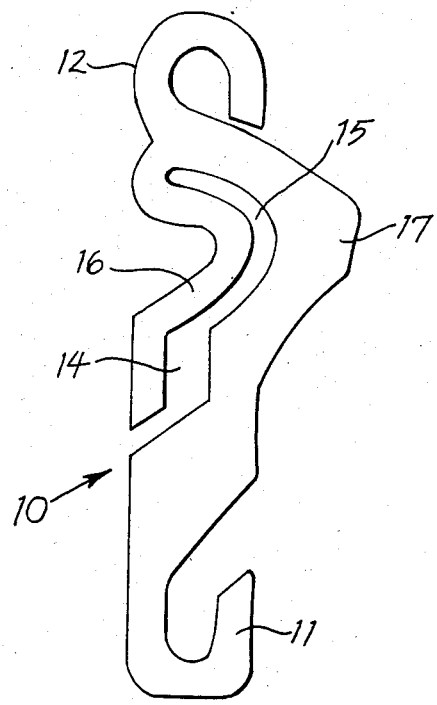
FIG. 7 is a top view of a further modification of the locking member.

FIG. 7 illustrates a further embodiment. The design of the locking member 10 of this embodiment corresponds basically to the design illustrated in FIG. 2. The difference of the embodiment of FIG. 7 is that the tongue 16 is a curved section and the groove adjacent this tongue extends similarly curved. This design having a longer tongue provides a larger flexibility of this tongue 16 and may be used, for instance, if the clasp is made of a metal having a somewhat smaller spring elasticity of the metal used for the locking member illustrated in FIG. 2.

The clasp for chains has been illustrated above exemplary embodied for an application in a jewelry chain. It is obvious, that a clasp which is formed identically or similar to this disclosed embodiment can be designed with rather large dimensions allowing a coupling of chains having larger dimensioned links. In such case the individual parts will obviously not be manufactured of gold but rather e.g. of steel and the manufacturer can, for instance, stamp on the projection 17 his trademark or, for instance, a maximal allowable pulling- or supporting load. A further application of such clasp would be a hook for a crane used, for instance, in the building industry.

While there are shown and described present preferred embodiments of the invention, it is to be distinctly understood that the invention is not limited thereto, but may be otherwise variously embodied and practiced within the scope of the following claims.

I claim:

1. A clasp for a chain, comprising a casing,
   a locking member resiliently supported in said casing and movable from a closed into an open position,
   a spring member coupled to said locking member and operative to maintain said locking member in its closed position,
   which casing is a flat shaped article bent to a U-form having two flanks,
   which locking member has the shape of a flat plate and is pivotable between the flank sections of said casing around a pin located at a central area of said casing, has one end formed to have the shape of a hook, the opening of which being closed off by an edge section of said casing, and has an eyelet provided at the end opposite of said hook, said locking member having further a projection projecting out of said casing and acting as an operating member for inducing opening movement of said hook,
   said pin comprising a rectangular cross-sectional shape and being supported in said casing in a non-rotatable manner,
   and which said locking member is spring elastic and comprises a rectangular opening corresponding in shape to said pin and in which a side wall defining said rectangular opening is of a spring elastic property by the provision of at least one slot opening into said rectangular opening.

2. The clasp of claim 1, in which there are provided two aligned slots located diametrically opposite relative to each other.

3. The clasp of claim 1, in which said casing comprises a projection corresponding in shape to the projection of said locking member.

4. The clasp of claim 1, in which said pin comprises a rectangular groove, the width of which corresponds to the thickness of said locking member, whereby the spring force of said locking member holds said pin securely in place.

* * * * *